United States Patent [19]

Chesmer et al.

[11] 4,270,656
[45] Jun. 2, 1981

[54] RUBBER AND FABRIC FEED BELT

[75] Inventors: Alec D. Chesmer; Joseph Turner, both of Windham Center, Conn.

[73] Assignee: Rogers Corporation, Rogers, Conn.

[21] Appl. No.: 840,590

[22] Filed: Oct. 11, 1977

[51] Int. Cl.³ .............................................. B65G 15/34
[52] U.S. Cl. .................................. 198/847; 474/205; 156/138; 264/162; 474/264; 474/271
[58] Field of Search ....................... 198/844, 846–847, 198/834, 688; 156/138, 137, 162; 264/162; 74/237, 231 C, 239

[56] References Cited

U.S. PATENT DOCUMENTS

| 2,298,867 | 10/1942 | Case | 156/138 |
| 3,464,875 | 9/1969 | Brooks et al. | 156/162 X |
| 3,964,328 | 6/1976 | Redmond | 74/231 C |

FOREIGN PATENT DOCUMENTS 2306179  8/1974  Fed. Rep. of Germany ........... 198/688

Primary Examiner—Jeffrey V. Nase
Assistant Examiner—Douglas D. Watts
Attorney, Agent, or Firm—Fishman and Van Kirk

[57] ABSTRACT

A construction and method of manufacture of a feed belt are presented wherein the belt is an endless body of elastomeric material reinforced with a fabric sleeve and having a toothed inner surface and a non-toothed outer surface, the inner and outer surfaces being treated so that the outer surface has a significantly higher coefficient of friction than the inner surface.

9 Claims, 4 Drawing Figures 4,270,656

RUBBER AND FABRIC FEED BELT

BACKGROUND OF THE INVENTION

This invention relates to the field of feed belts for paper, such as for xerographic copying machines, as well as for cardboard, plastic and other such materials. More particularly, this invention relates to a fabric reinforced endless belt of elastomeric material, such as in the nature of a toothed drive belt, especially effective for the feeding of paper and other similar materials such as cardboard, plastic and other sheet materials.

In the operation of machinery of various types, the accurate and reliable feeding of supplies of paper, cardboard, plastic and the like is extremely important to the proper functioning of the machinery. In photo copying machines, for example, proper functioning of the machinery requires the accurate and reliable delivery of paper upon which the copy is to be produced. Regardless of how well the reproductive mechanism of the equipment may work, a photographic copying machine does no turn out a useful product if the duplicating paper is not accurately and reliably delivered to and moved through various stations of the machine. Accordingly, the accuracy and reliability of the paper feed mechanism, while being only a very small part of the photo copy machine is, nevertheless, a critical part, and there is significant interest in improving the accuracy and reliability of that part.

SUMMARY OF THE INVENTION

The present invention relates to the structure and method of manufacture of a feed belt for paper, cardboard, plastic and other such materials, the belt being particularly suitable for paper feed in photo copying machinery. In accordance with the present invention, an endless belt of elastomeric material is reinforced with a sleeve of fabric or other woven material. The inner surface of the belt has teeth, such as in the nature of a toothed drive belt, and the reinforcing fabric sleeve is located at or about the pitch line of the belt. The toothed inner surface of the belt and the non-toothed outer surface are chemically treated so that the outer surface has a substantially higher coefficient of friction than the toothed inner surface. The chemical treatment is a halogenation treatment, and the preferred method of treatment involves immersing the entire belt in a chlorination bath whereby a chemical reaction occurs to form a modified skin surface on both the inner and outer surfaces having a relatively low coefficient of friction. The modified skin on the outer surface is then removed by grinding the outer surface to expose untreated elastomeric material having a substantially higher coefficient of friction than the inner surface.

The teeth on the inner surface of the belt engage geared pulleys to be driven as in the nature of a timing belt. The treated inner toothed surface of the belt is extremely wear resistant because of the modified finish on the teeth, and the reduced friction of the toothed inner surface assures that the feed belt will not ride over the teeth of the pulleys. Both of these advantages of the toothed inner surface of the belt are realized without having to resort to the use of separate and distinct protective coverings on the teeth as is known in the art of toothed drive belts. Those separate protective coverings significantly increase the expense of belts, and they also tend to reduce the flexibility of a belt. Since the chlorinated skin of the outer surface of the belt is ground away, the outer surface of the belt has a coefficient of friction substantially higher than the inner surface of the belt, so the outer surface forms an extremely effective and reliable gripping surface for engagement with and feeding of paper in a photo copy machine.

The belt of the present invention is less expensive to manufacture, an objective which is always highly desirable; and the fact that the belt does not have a fabric or other protective covering on the teeth also improves the flexibility of the belt, which is important in extending the life of the belt and for other reasons. Prior art fabric or card reinforced belts are generally stiffer and less compliant than belts of the present invention. This stiffness requires higher forces between the pulleys to properly position the belt. The belts of the present invention, in addition to the differential coefficients of friction, are more flexible and more compliant than general prior art belts, and thus are particularly suitable for paper and material feeding purposes.

Accordingly, one object of the present invention is to provide a novel and improved feed belt for sheet material such as paper, cardboard, plastic and the like.

Another object of the present invention is to provide a novel and improved feed belt for delivering paper in photo copy machines.

Still another object of the present invention is to provide a novel and improved feed belt having a toothed inner surface with a chemically treated and modified skin of reduced coefficient of friction and a non-toothed outer surface having a surface of higher coefficient of friction than the inner surface.

Still another object of the present invention is to provide a novel and improved method of manufacturing a feed belt having a toothed inner surface with a modified skin to reduce the coefficient of friction and a non-toothed outer surface having a coefficient of friction substantially higher than the inner surface.

Other objects and advantages of the present invention will be apparent to and understood by those skilled in the art from the following detailed description and drawings.

DESCRIPTION OF THE PREFERRED EMBODIMENTS

Figure 1:
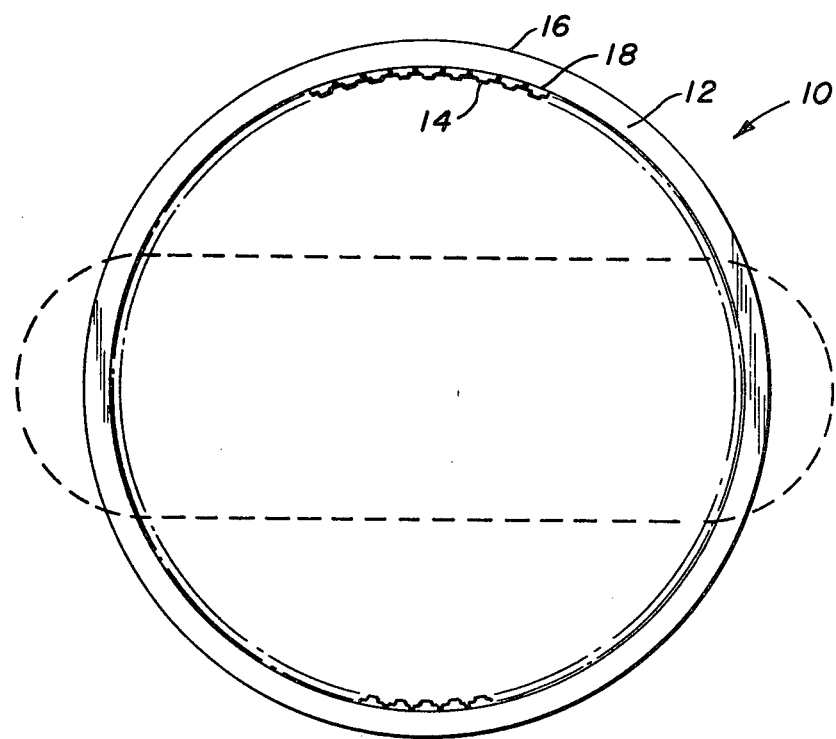
FIG. 1 is a side elevation view of the belt of the present invention.
Figure 2:
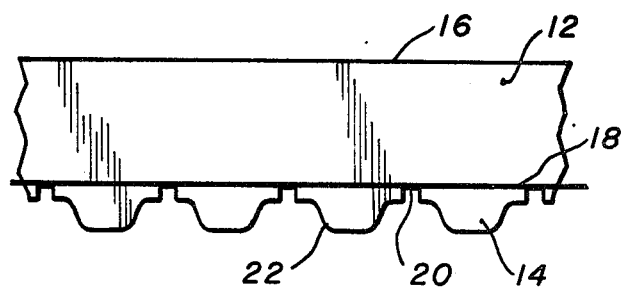
FIG. 2 is an enlarged detail of a segment of the belt of FIG. 1.

Referring to FIGS. 1 and 2, the general structure of the belt of the present invention is shown. Belt 10, which is shown in FIG. 1 in its normal or unstressed state, is an endless band structure having a body 12 of elastomeric material. An array of teeth 14 are formed around the entire inner surface of belt 10, while the outer surface 16 of the belt is an essentially smooth, i.e. even, surface or it may be provided with circumferential score lines at intervals along the width of the belt, i.e. along the dimension of the belt perpendicular to the plane of the paper. As can best be seen in FIG. 2, a reinforcing sleeve 18 is incorporated in the belt and is located at or in the vicinity of the pitch line of the belt.

Notches or spaces 20 separate each of the adjacent teeth 14 and penetrate into the elastomeric material of the belt to a depth so that the reinforcing sleeve 18 is actually visible between the teeth. Sleeve 18 is preferably a substantially inextensible continuous sleeve of woven fabric material which serves both to reinforce the belt and make the belt essentially non-extensible. The sleeve and the belt, including the teeth 14, form a unitary molded structure. The spacing between the teeth contributes to increasing the flexibility, and hence the life, of the belt. As will be discussed in more detail hereinafter, the surface 22 of teeth 14 and the outer surface 16 of the belt are treated so that the teeth are modified and have a lower coefficient of friction relative to the outer surface 16, and outer surface 16 is treated so that it has a higher coefficient of friction than the surface of teeth 14.

When mounted on pulleys in a photo copy or other machine, belt 10 would assume a shape such as shown in the dashed lines in FIG. 1, with the teeth 14 engaging complementary teeth on pulleys, and outer surface 16 of relatively high coefficient of friction being positioned to engage paper or other material to be fed to a machine. The chemically modified teeth 14 of low friction contribute to long tooth life and eliminate or reduce the problem of the teeth riding up over the teeth of a drive pulley. The high coefficient of friction of the outer surface 16 provides a firm and steady contact on the paper and eliminates slip between the paper and belt.

Figure 3:
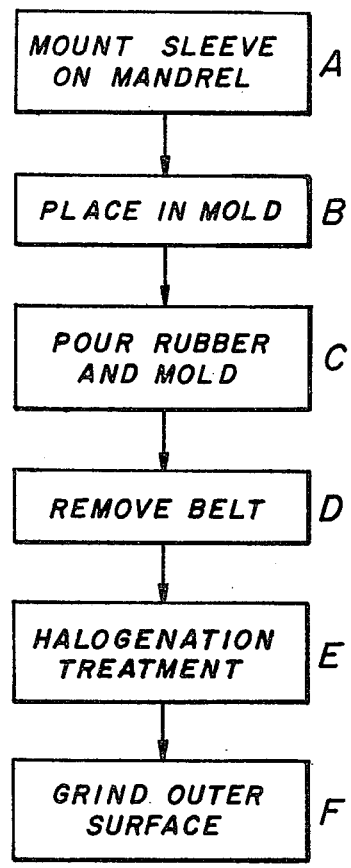
FIG. 3 is a flow diagram illustrating the processing steps in forming the belt of the present invention.
Figure 4:
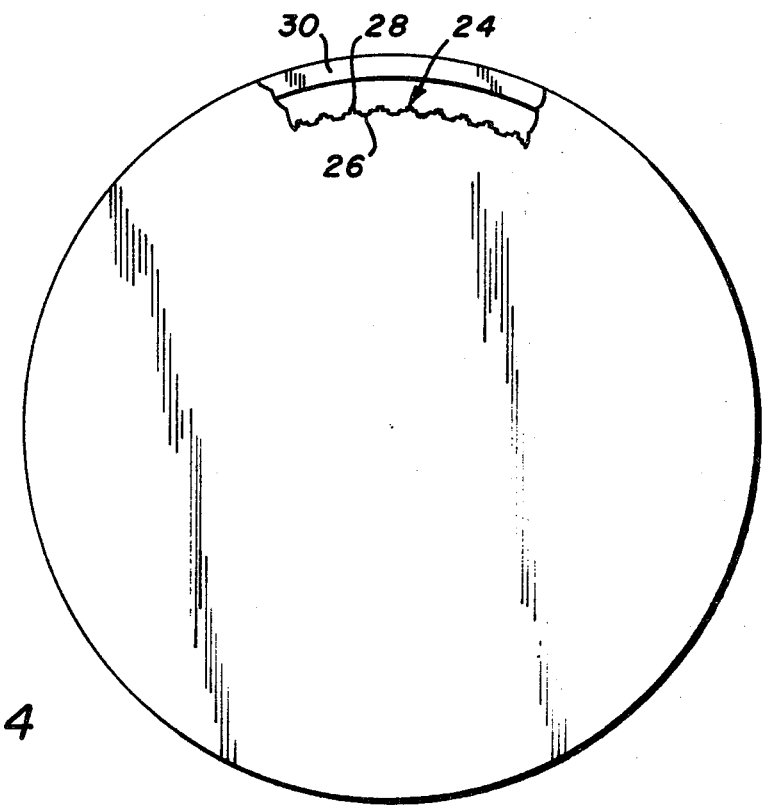
FIG. 4 shows a mold and mandrel for forming the belt of the present invention.

Referring now to FIGS. 3 and 4, the method for forming the belt is illustrated. Fabric reinforcing sleeve 18 is mounted on the outer surface of a mandrel 24 which has recesses 26 and projections 28 complementary in shape to teeth 14 and notches 20. Fabric sleeve 18 is actually supported on projections 28 when mounted on the mandrel, and the sleeve is positioned so that it will be at about the pitch line of the belt when molding is completed. The step of mounting the fabric sleeve on the mandrel is indicated at step A in FIG. 3. After the sleeve is in place on the mandrel, the mandrel is then placed in a mold 30 as illustrated in step B. The material from which the belt is to be formed, preferably polyisoprene rubber, is then introduced into the mold between mold 30 and mandrel 24, as illustrated in step C. The elastomeric material fills the mold and flows through the fabric sleeve to fill the recesses 26 and completely encapsulate the reinforcing sleeve 18 in the elastomeric material. The elastomeric material is then cured to complete the molding process of step C. The mandrel is then removed from the mold, and the belt is removed from the mandrel as indicated in step D. If desired or necessary, the mandrel may be collapsible, in a manner well known in the art, to facilitate removing the belt from the mandrel.

The belt is then subjected to a halogenation treatment, the preferred method being to dip the belt in a chlorination bath as indicated in step E. The chlorination bath produces a chemical reaction with the polyisoprene rubber material which has an effect similar to oxidizing the surface of the rubber to form a chemically modified surface skin. Although the precise nature of the reaction is not fully understood, one theory is that the nascent or atomic chlorine reacts with the polyisoprene rubber to chemically alter the nature of the surface. The chemically altered surface exhibits higher hardness and higher modulus (i.e. stiffer) than the bulk of the polyisoprene rubber and has a much lower coefficient of friction than before treatment.

Outer surface 16 of the belt is then ground in step F to remove the modified skin surface formed thereon to expose the untreated rubber which has a significantly higher coefficient of friction than the modified skin on the inner surface of the belt. Thus, the final product is an endless reinforced belt having an inner toothed surface which is chemically modified and has a relatively low coefficient of friction and an outer surface which has a significantly higher coefficient of friction. By way of example, in a preferred configuration in which the belt is polyisoprene rubber, the inner surface of the belt and the teeth have a modified skin surface with a coefficient of friction of less than 1.0, and the outer surface of the belt has a coefficient of friction greater than 2.0. The coefficients of friction were measured in accordance with ASTM D 1894 Test Procedure using a standard grade of dry copier paper, a normal load of 225 grams, and speed of 500 mm per minute.

It should be noted that in addition to the preferred elastomeric material of polyisoprene rubber, other elastomers which are receptive to the halogen treatment may also be used. For example, natural rubbers and polymers or copolymers of butadiene or styrene may also be used. Other chemical treatments which convert the surfaces of the belt may also be used if they are effective to produce the desired surface modification without adverse effects on the belt.

As previously indicated, the belt of the present invention achieves significant improvements and advantages over the prior art.

While preferred embodiments have been shown and described, various modifications and substitutions may be made thereto without departing from the spirit and scope of the invention. Accordingly, it is to be understood that the present invention has been described by way of illustration and not limitation.

What is claimed is:

1. A feed belt comprising:
   an endless band of elastomeric material having an inner surface and an outer surface;
   reinforcing means embedded in said band of elastomeric material, said reinforcing means comprising fabric material positioned at the pitch line of the belt;
   a plurality of teeth spaced about said inner surface of said belt, said teeth being formed from said elastomeric material and being integral with said band, said reinforcing means being exposed in the spaces between said teeth; and
   a surface layer on said teeth, said surface layer being formed from said elastomeric material and having a coefficient of friction which is less than the coefficient of friction of the outer surface of said band of elastomeric material.

2. The feed belt of claim 1 wherein said reinforcing means is in the form of an endless band.

3. The feed belt of claim 2 wherein said elastomeric material is selected from the group comprising polyisoprene rubber, natural rubber, butadiene polymers, butadiene copolymers, styrene polymers and styrene copolymers.

4. A feed belt as in claim 1 wherein said surface layer comprises a halogenated layer of the elastomeric material.

5. The feed belt of claim 1 wherein said surface layer has a coefficient of friction of less than 1.0 and wherein the outer surface of said endless band of elastomeric material has a coefficient of friction in excess of 2.0.

6. A feed belt as in claim 5 wherein said surface layer comprises a halogenated layer of the elastomeric material.

7. The feed belt of claim 2 wherein said surface layer has a coefficient of friction of less than 1.0 and wherein the outer surface of said endless band of elastomeric material has a coefficient of friction in excess of 2.0.

8. A feed belt as in claim 7 wherein said surface layer comprises a halogenated layer of the elastomeric material.

9. The feed belt of claim 8 wherein said elastomeric material is selected from the group comprising polyisoprene rubber, natural rubber, butadiene polymers, butadiene copolymers, styrene polymers and styrene copolymers.

* * * * *